United States Patent [19]

Wu

[11] 3,988,688

[45] Oct. 26, 1976

[54] DEMODULATOR FOR BINARY-PHASE MODULATED SIGNALS HAVING A VARIABLE CLOCK RATE

[75] Inventor: Ta Tzu Wu, Pasadena, Calif.

[73] Assignee: California Institute of Technology, Pasadena, Calif.

[22] Filed: Feb. 28, 1975

[21] Appl. No.: 554,064

[52] U.S. Cl. ............................ 329/107; 307/232; 328/110; 340/167 A
[51] Int. Cl.² ........................................ H03K 9/04
[58] Field of Search ..................... 329/106, 107; 340/167 A; 328/109, 110, 133; 307/232

[56] References Cited
UNITED STATES PATENTS

| | | | |
|---|---|---|---|
| 3,805,175 | 4/1974 | Nassimbene | 329/107 |
| 3,902,129 | 8/1975 | Boothroyd | 329/107 |

Primary Examiner—John Kominski
Attorney, Agent, or Firm—Fulwider, Patton, Rieber, Lee & Utecht

[57] ABSTRACT

Method and apparatus for demodulating binary-phase modulated signals recorded on a magnetic stripe on a card as the card is manually inserted into a card reader. Magnetic transitions are sensed as the card is read and the time interval between immediately preceeding basic transitions determines the duration of a data sampling pulse which detects the presence or absence of an intermediate transition pulse indicative of two respective logic states. The duration of the data sampling pulse is approximately 75 percent of the preceeding interval between basic transitions to permit tracking succeeding time differences in basic transition intervals of up to approximately 25 percent.

6 Claims, 13 Drawing Figures

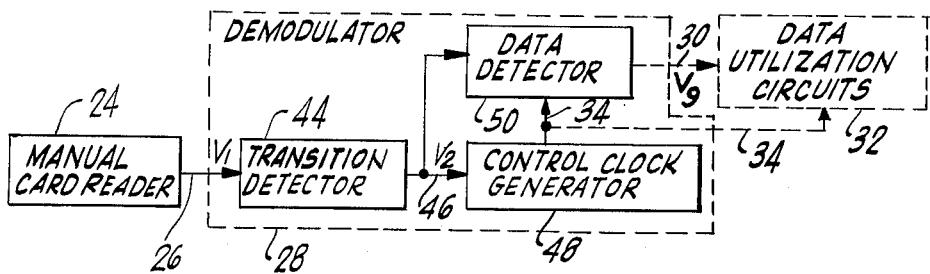
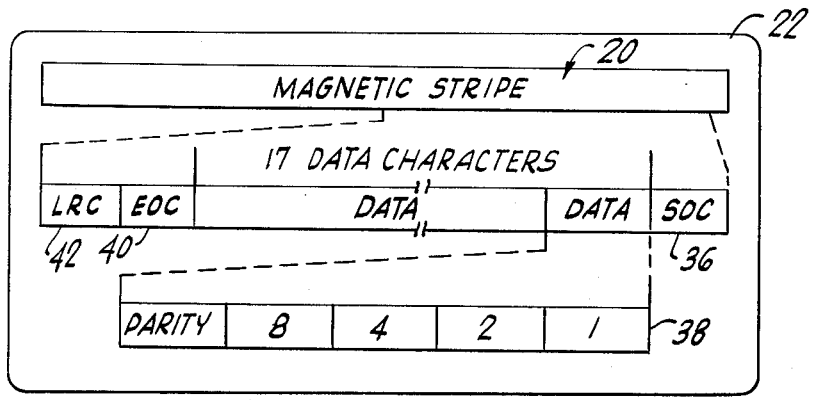
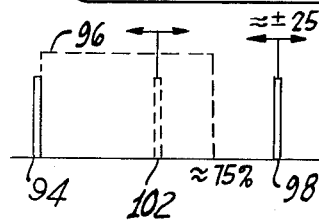
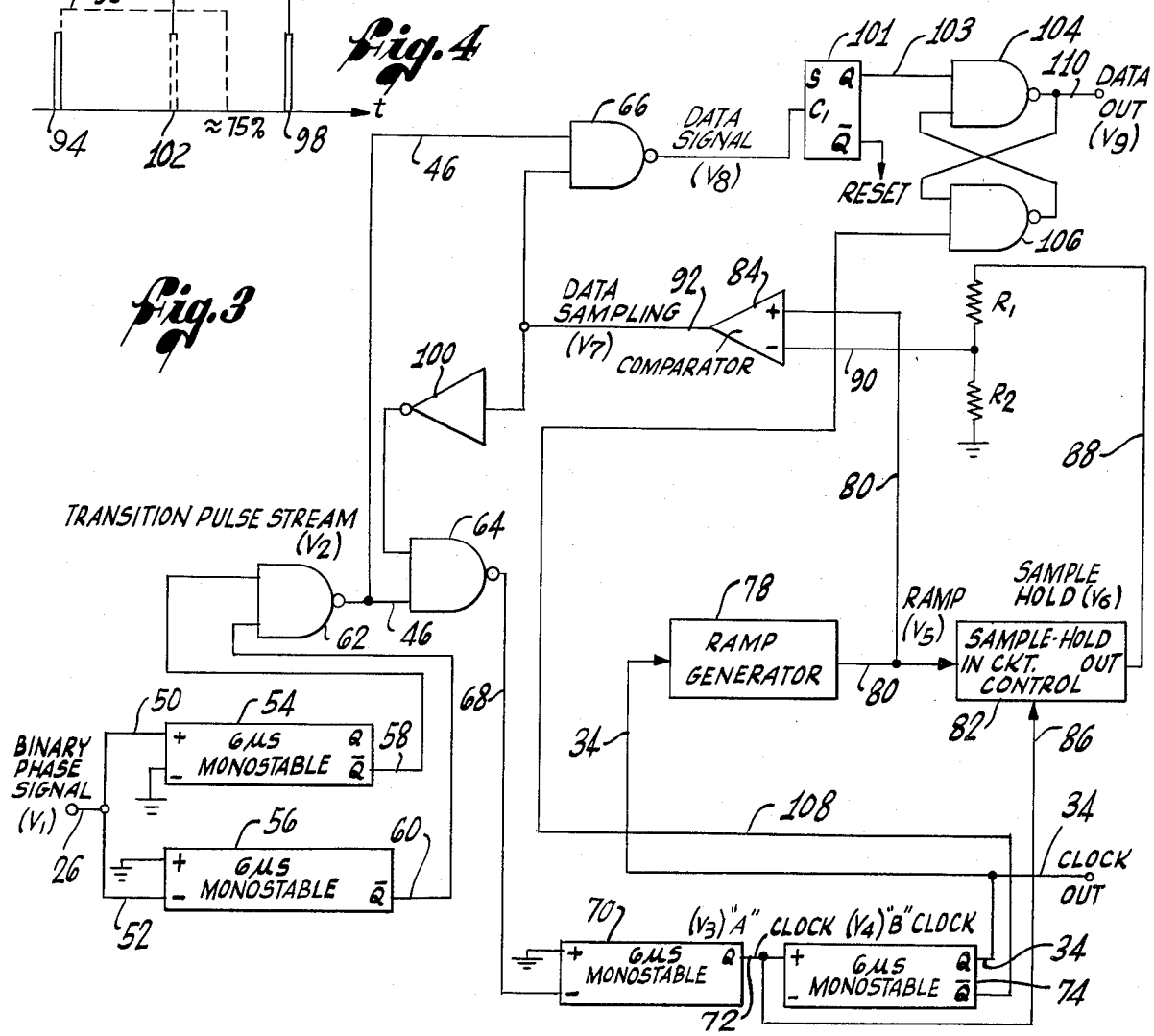

DEMODULATOR FOR BINARY-PHASE MODULATED SIGNALS HAVING A VARIABLE CLOCK RATE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates generally to demodulation of binary-phase modulated signals having a variable clock rate and, more particularly, to a demodulation technique for recovering data from a magnetically encoded strip on a card as the card is manually inserted into a card reader at a variable insertion speed.

2. Decription of the Prior Art

In the field of magnetic card readers, two basic techniques have been utilized in the prior art. A first technique is to provide the data on a single magnetic track and to provide a means, such as a motor drive, to move the card past a reading head at a uniform rate which matches an internal data reading clock to the rate at which data is encoded on the magnetic stripe. Card readers utilizing this technique require regulated motor drives and card reading mechanisms which are relatively costly both initially and to maintain.

A second basic prior art technique is to provide a card reader in which the card is manually inserted and to provide a second synchronizing clock track on the card which synchronizes the internal data reading clock with the rate at which the card is inserted into the reader. This technique is also costly in that, not only are two magnetic tracks required, but two data reading heads are necessary to detect both the recorded data and the recorded clock synchronizing pulses.

Thus, there has long been a need for an asynchronous data reading technique which would permit reading data from a single magnetic stripe on a card as the card was manually inserted into a card reader. The present invention satisfies that need.

SUMMARY OF THE INVENTION

The present invention provides a demodulating system for recovering data recorded on a magnetic stripe or the like as that data is asynchronously read from the magnetic stripe such as when the recording media is manually inserted into a reading mechanism. In the presently preferred embodiment of the invention, the data is recorded utilizing binary-phase modulated signals on a magnetic stripe and magnetic transitions on the stripe are sensed and utilized to generate corresponding transition pulses at a basic time interval. The presence or absence of an intermediate transition pulse between basic transition pulses is indicative of one of two respective logic states.

To sense the intermediate pulses, a data sampling pulse is generated at the occurrence of each basic transition pulse. The sampling pulse has a duration of approximately 75 percent of the time interval between the preceeding basic transition pulses. Therefore, the following basic transition pulse can occur at approximately + or − 25 percent of the preceeding basic time interval and the intermediate pulse and corresponding data will be correctly detected. Thus, the only limiting criteria for correctly detecting data is that the time intervals between succeeding basic transition pulses do not vary by more than 25 percent. It has been found that this criteria permits correct detection of data at any practical rate of card insertion into a reader equipped with the demodulation system of the present invention will "track" the varying data reading rate.

These and other features of the demodulation system of the present invention are described in more detail below.

DESCRIPTION OF THE DRAWINGS

FIG. 1 is a block diagram of the overall demodulating system of the present invention;

FIG. 2 is a diagramatic view of a card and the format of the data carrying magnetic stripe thereon;

FIG. 3 is a functional block diagram illustrating the operation of the demodulator technique;

FIG. 4 is an illustrative timing diagram illustrating the relationship between the basic transistion interval pulses and the data sampling pulse.

DESCRIPTION OF THE PREFERRED EMBODIMENT

Figure 5:
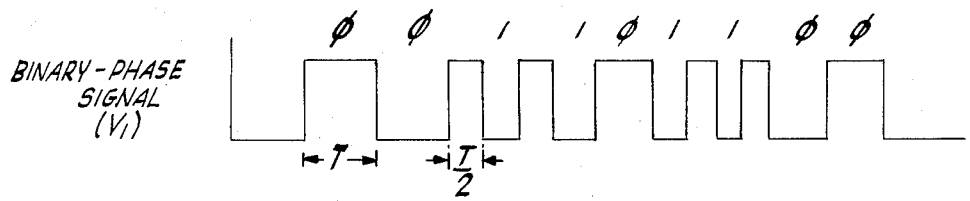
FIGS. 5 through 13 are illustrative waveforms appearing at various points in the functional block diagram of FIG. 3.

Turning now to the drawings, particularly FIGS. 1 and 2 thereof, the presently preferred embodiment of the demodulation system of the invention is intended for use in recovering data encoded on a magnetic stripe 20 on a plastic card 22 such as a conventional credit card, or the like. To read the data, the card 22 is manually inserted into a card reader 24 where the encoded data is recovered utilizing conventional reading techniques. The encoded data is fed through a line 26 to a demodulator 28 which converts the endoded data into a serial data stream which is in turn transferred though a line 30 to data utilization circuits 32. Along with the data stream on line 30, the demodulator 26 generates a synchronizing clock pulse stream on a line 34 which is also transmitted to the data utilization circuits 32.

As the card 22 is manually inserted into the card reader 24, the rate at which the card is inserted may vary and, consequently, the rate at which encoded data is read is also variable. As the data encoded on the stripe 20 does not have synchronizing clock pulses associated with it, the demodulator 28 must receive the encoded data with a varying data rate and correctly decode or demodulate the variable data into a data bit stream and synchronizing clock pulses so that the data may be utilized by the conventional circuits 32. While the data bit stream on line 30 also has a variable rate, it should be appreciated that the synchronizing clock pulses on line 34 permit the serial transfer of the data into the conventional circuits 32 where further processing may be done.

The data on the magnetic stripe 20 on the card 22 is arranged in accordance with a conventionally accepted format for such cards in that the magnetic stripe includes approximately ten synchronizing bits (not shown), which serve to develop an internal starting rate for the data tracking clock within the demodulator 28. Following the synchronizing bits, the conventional format includes a START OF CARD (SOC) character 36 which is in turn followed by seventeen data characters 38 generally having four information bits and one parity bit. Following the seventeen data characters 38, an END OF CARD (EOC) character 40 and a LONGITUDINAL-REDUNDANT-CHECK (LRC) character 42 indicates the end of the information encoded on the magnetic stripe 20.

The data on the stripe 20 is encoded in accordance with a conventional binary-phase modulation technique in which one logical state is recorded as a signal having a particular repetition rate of frequency (F) and a second logical state is recorded as a signal having a repetition rate of frequency which is twice that of the basic rate (2F). When such a signal is read by a card reader 24, for example, the signal has the characteristics of the signal $V_1$ illustrated in FIG. 5. In the signal shown in FIG. 5, the 0 logical state is indicated by a signal which has transitions occuring at a time interval T and the 1 logical state is indicated by an intermediate transition at an interval T/2. In interpreting this signal, it can be seen that, if the basic time interval between transitions (T) can be determined, the logical 0 state is represented by the fact that no intermediate transition occurs between transitions and the logical 1 is indicated by an intermediate transition between the basic transition times. However, as can be seen in the signal diagram of FIG. 5, the basic time interval between transitions (T) is not uniform due to the fact that the card 22 may be inserted into the card reader 24 at a varying rate.

The demodulator 28 of the present invention, receives the binary-phase signal ($V_1$), determines and tracks the basic transition internal T over a wide range of values and determines the 0 or 1 logical state of the encoded data. In accomplishing these ends, the demodulator 28 of FIG. 1 includes a transition detector 44 which detects each transition in the binary-phase signal $V_1$ and produces a transition pulse stream $V_2$ on a line 46. The transition pulse stream on line 46 is applied both to a control clock generator 48 and to a data detector 50. The control clock generator 48 senses and tracks the basic transition interval and applies corresponding clock pulses to the data detector 50 via line 34. The data detector 50 senses any intermediate transition pulses which indicate the logic state of 1 as discussed above.

The data output ($V_9$, FIG. 13) of the data detector 50 is therefore either a 0 voltage level or a 1 voltage level on the line 30 which is applied to the data utilization circuits 32. The basic clock pulses on line 34 are also available to the data utilization circuits 32 so that the voltage levels on line 30 may be correctly interpreted by the conventional circuitry. Thus, the logical voltage levels $V_9$ on line 30 and the clock pulses on line 34 serially define the demodulated data, which is ready for use in the conventional utilization circuits 32.

Figure 6:
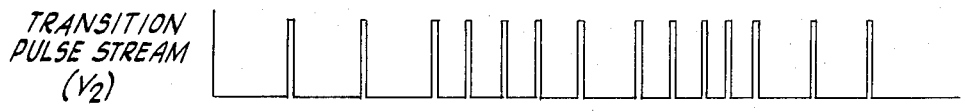

A functional block diagram of the circuitry utilized in the presently preferred embodiment of the demodulation system of the invention is shown in FIG. 3. The binary-phase modulated signal $V_1$ (FIG. 5) is applied as the input on a line 26 to opposite polarity inputs 50 and 52 of a respective pair of mono-stable multivibrators 54 and 56. The multivibrators 54 and 56 have relatively short triggered time periods of approximately 6 microseconds and their low outputs ($\bar{Q}$) 58 and 60 are connected as inputs to a NAND gate 62. In this configuration, the NAND gate 62 functions as an OR gate so that its output is a combination of positive going transition pulses representing either a positive or negative going transition of the binary-phase signal $V_1$. The output of the NAND gate 62 is then a transition pulse stream $V_2$, as illustrated in FIG. 6, with a positive going pulse for each transition of the binary-phase signal $V_1$ shown in FIG. 5.

Figure 7:
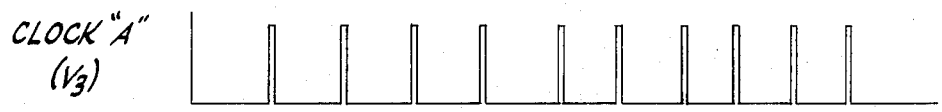
Figure 8:
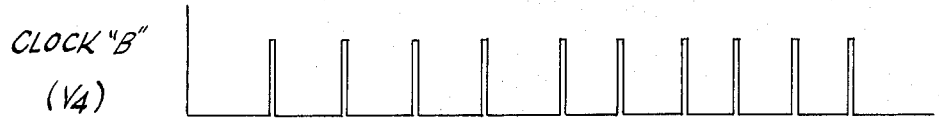

The transition pulse stream $V_2$ is applied as one input to NAND gate 64. NAND gate 64 is enabled only to pass transition pulses occurring at the basic transition pulse rate, will be described in further detail below. The basic transition pulses appearing as the output of the NAND gate 64 on line 68 are applied to the negative input of a monostable multivibrator 70, the output of which is applied through line 72 to the positive input of another monostable multivibrator 74. The output of the monostable multivibrator 70 is designated the "A" clock $V_3$ appearing in FIG. 7 and the output of the multivibrator 74 is designated the "B" clock signal $V_4$ and illustrated in FIG. 8. The initiation of the B clock signal occurs at the end of A clock signal. Both clock signals are approximately 6 microseconds long as determined by the triggered periods of the multivibrators 70 and 74. The A and B clock signals, therefore sequentially follow the basic transition pulses on line 68 and are used for clocking the remaining signal processing in the data detector 50. Referring to FIG. 1, either the A or B clock signals may be utilized, depending on the particular application, as the control clock on line 34 for further use by the data utilization circuits 32.

Figure 9:
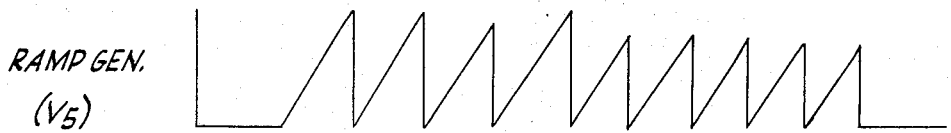
Figure 10:
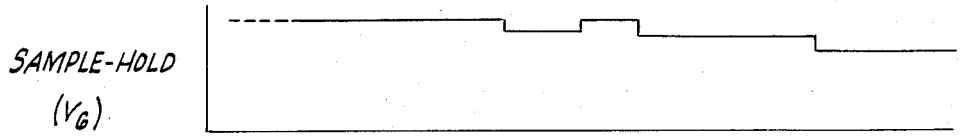

The B clock pulse on line 34 is applied to a resetting input of a ramp generator 78, the output of which on line 80 is the ramp signal $V_5$ illustrated in FIG. 9. The ramp signal $V_5$ is applied to the input of a sample and hold circuit 82 and to the positive input of a comparator 84. The transfer control of sample-hold circuit 82 on line 86 is controlled by the A clock signal which transfers and holds the instantaneous ramp signal $V_5$ immediately prior to resetting of the ramp generator by the B clock signal. The output of the sample-hold circuit 82 on line 88 is then the sample-hold signal $V_6$ as shown in FIG. 10. It will be appreciated that the held voltage is dependent upon the time over which the ramp generator 78 operates and thus is dependent upon the time interval T between basic transition pulses. Thus, as shown in FIG. 10, as the basic time interval T decreases, the held voltage decreases. The held voltage on line 88 is therefore dependent upon the time interval T between the last two immediately preceeding basic transition pulses of the transition pulse stream $V_2$.

Figure 11:

The output $V_6$ of the sample-hold circuit 82 on line 88 is applied to a voltage divider including resistors R1 and R2 with the resistor tap being connected through a line 90 to the negative input of a comparator 84. For the presently preferred embodiment of the invention, the ratio of resistors R1 and R2 is such that the voltage level on line 90 is approximately 75 percent of the output voltage of the sample-hold circuit 82 on line 88. The ramp signal $V_5$ on line 80 is connected to the position input of the comparator 84 and its operation is such that the comparator output on line 92 appears as a data sampling signal $V_7$ as shown in FIG. 11 whenever the ramp signal $V_5$ is less than the tap voltage on line 90. Thus, the data sampling signal $V_7$ on line 92 is present for approximately 75 percent of the time interval between the immediately preceeding basic transition pulses. This is illustrated in FIG. 4 in which a transition pulse 94 initiates the beginning of a data sampling pulse 96 which occurs for approximately 75 percent of the immediately preceeding basic time interval.

Thus, the next basic transition pulse 98 may occur up to 25 percent sooner than the last basic transition pulse interval.

The data sampling signal $V_7$ is applied to the second input of an NAND gate 66 which enables that gate during the interval the data sampling signal is on and the sampling signal is also applied through an inverter 100 to the second input of the NAND gate 64 which disables that gate during the time the data sampling signal is on. Therefore any intermediate transition pulses appearing on the transition pulse stream $V_2$ during the time the data sampling signal is on are permitted to pass through the gate 66 but are blocked from passing through the gate 64. When the data sampling signal $V_7$ is off, the opposite case holds and the basic transition pulses are blocked from passing through the gate 66 but are permitted to pass through the gate 64 to the timing multivibrators 70 and 74.

Figure 12:
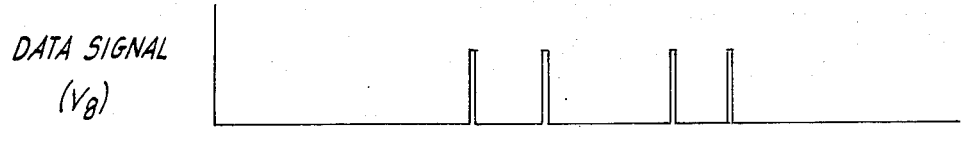

Referring to FIG. 4, an intermediate transition pulse 102 occuring during the time when the data sampling pulse 96 is on will pass through the gate 66 as a data signal $V_8$ illustrated in FIG. 12 to an input to a flip-flop 101 with its Q output connected to a latch consisting of two cross-coupled NAND gates 104 and 106. Should a second transition pulse occur, the $\overline{Q}$ output of flip-flop 101 will generate a reset signal. It will be appreciated that the intermediate transition pulse 102 may occur at any time during the time the data sampling signal $V_7$ is on, but it is dependent upon the time interval between the initiating basic transition pulse 94 and the next following basic transition pulse 98. Thus, the next basic transition 98 may occur at a time approximately 25 percent later than the last preceding time interval and the intermediate transition pulse 102 will still be within the data sampling signal time and therefore be detected.

Figure 13:
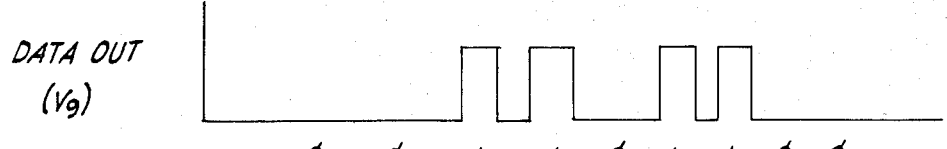

When the next basic transition pulse 98 occurs, the Q signal of multivibrator 74 is connected through a line 108 to a resetting input of the latch. Thus, the data output signal $V_9$ on line 110 appears as shown in FIG. 13 in which a 0 logic level appears as a no voltage condition while a 1 logic level appears as a step voltage for a predetermined time period dependent upon the basic transition pulse rate. The combination of the A or B clock signals $V_3$ or $V_4$ and the data output signal $V_8$ therefore fully defines the recovered data and its clock rate for use by the data utilization circuits 32 shown in FIG. 1.

From a consideration of FIG. 3, it can be seen that the time interval between basic transition pulses may increase or decrease by 25 percent between pulses and the demodulation system of the present invention will track that change in pulse rate and also recover the data in the form of the occurrence or non-occurrence of an intermediate transition pulse during the time that the data sampling pulse is present. Thus, the rate at which the data is read by the card reader 25 due to the fact that the card 22 is manually inserted may vary relatively widely during data reading and the demodulation system of the present invention will track and correctly read the data encoded on the magnetic stripe 20.

However, while a presently preferred embodiment of the invention has been herein described preferred embodiment of the invention has been herein described in detail, it should be appreciated that the invention may be practiced in a number of different ways. Therefore, the scope of the invention is not to be limited except by the claims.

I claim:

1. A demodulator for binary-phase modulated signals having a variable clock rate, the signals including basic transitions between two possible signal states spaced at basic time intervals of approximately equal length, and intermediate transitions between selected adjacent ones of the basic transitions, to represent binary digits of coded data, said demodulator comprising:

sensing means for sensing transitions of said modulated signals in either direction between the two possible signal states;

clock means connected to said sensing means for generating control clock pulses corresponding in time to the occurrence of the basic transitions in said modulated signals; and data detection means connected to said sensing means for detecting intermediate transitions occurring between control clock pulses, said intermediate transitions being indicative of one logic state and the lack of said intermediate transitions being indicative of a second logic state, said data detection means including timing means for measuring the times between successive basic transitions, and circuit means coupled with said timing means, for enabling detection of said intermediate transitions immediately after each basic transition and inhibiting detection of said intermediate transition after a predetermined percentage of the time interval between the two immediately preceding basic transitions;

whereby said clock means and said data detection means operate to detect basic and intermediate transitions, respectively, even when the basic time interval between basic transitions varies substantially in length.

2. A demodulator in accordance with claim 1 wherein:

said timing means includes ramp generator means reset by basic transitions; and sample-hold means for holding the ramp at its value just prior to being reset;

and said circuit means includes voltage divider means for generating a comparison voltage which is a predetermined percentage of said sample-hold voltage;

comparison means for comparing said ramp voltage with said comparison voltage to generate an inhibit signal when said ramp voltage is equal to said comparison voltage; and means for detecting said intermediate transitions, said detecting means being inhibited by said inhibit signal of said comparison means;

whereby said ramp generator means generates a signal proportional to the time elapsed since the last-occurring basic transition, said sample-hold means holds a signal proportional to the time interval between the two immediately preceeding basic transitions, and said voltage divider means, said comparison means and said means for detecting intermediate transitions all cooperate to enable detection of intermediate transitions for the predetermined percentage of the last measured basic time interval between basic transitions.

3. A demodulator as defined in claim 2, wherein:

said predetermined percentage is approximately 75 percent.

4. A method for demodulating binary-phase modulated signals having a variable clock rate, the signals including basic transitions between two possible signal states spaced at basic time intervals of approximately equal lengths, and intermediate transitions between selected adjacent ones of the basic transitions, to represent binary digits of coded data, said method comprising the steps of:

sensing basic and intermediate transitions of said modulated signals;

generating control clock pulses corresponding to the basic time interval between said basic transitions; and detecting intermediate transitions occurring between control clock pulses, said intermediate transitions being indicative of one logic state and the lack of said intermediate transitions being indicative of a second logic state, and said detecting step including generating a data sampling signal initiated with each basic transition, the duration of said sampling signal being a predetermined percentage of the basic time interval between the two immediately preceeding basic transitions, said intermediate transitions being detectable for the duration of said data sampling signal.

5. The method defined in claim 4, wherein said step of generating a data sampling signal includes:

generating a ramp signal which is reset by each basic transition;

sampling and holding the ramp voltage immediately prior to resetting said ramp voltage;

applying a fixed percentage of said held voltage to one input of a comparing means; and applying said ramp voltage to a second input of said comparing means, the output of said comparing means being said data sampling signal which is present whenever said ramp voltage is lower than said predetermined percentage of said held voltage;

whereby said held voltage represents the basic time interval between the two immediately preceding basic transitions, and said ramp voltage represents the time elapsed since the occurrence of the last-occurring basic transition.

6. The method defined in claim 5 wherein:
said predetermined percentage is 75 percent.

* * * * *